United States Patent Office 2,989,433
Patented June 20, 1961

2,989,433
PROCESS OF PREPARING LAMINATED STRUCTURES
Edward Lung Yuan, Cornwall on the Hudson, N.Y., assignor to E. I. du Pont de Nemours and Company, Wilmington, Del., a corporation of Delaware
No Drawing. Filed June 18, 1957, Ser. No. 666,481
3 Claims. (Cl. 154—128)

This invention relates to a process of preparing heat-resistant laminated structures, more specifically to such structures comprising a polytetrafluoroethylene sheet material having a metallic layer firmly adhered to a surface thereof and it further relates to methods of making such structures.

Polytetrafluoroethylene is a synthetic polymer which has outstanding resistance to heat, solvents and chemicals, and excellent electrical properties. It has established a unique reputation in the field of high temperature electrical insulation, withstanding conditions which will char and decompose most known organic insulation materials.

When made into sheet form, such as unsupported films, coated fabrics, and coated fabric laminates, polytetrafluoroethylene products have yet another useful and unusual property. Their surfaces have a slippery, waxy and unctuous texture which prevents other materials, including the stickiest adhesives, from adhering to them. For example, the sheets are used as anti-sticking liners for the platens of laminating presses, where they prevent adhesion of the materials being laminated to the metal platens at high temperatures and pressures.

There is a need for a polytetrafluoroethylene sheet having a metallic layer securely bonded to one or both surfaces. There is particular need for such a structure in high temperature printed circuit applications, where an electrically conductive metallic layer is adhered to a surface of an insulating sheet material. Other needs arise where it is desired to combine the unusual properties of polytetrafluoroethylene with the properties of metal in a single integrated structure.

Many attempts have been made to adhere metallic layers to polytetrafluoroethylene sheets, but heretofore, none have resulted in a simple, economical, and effective method. Chemical inertness, heat stability, and slippery surface texture, the very properties which are so desirable in many applications, have made it impossible to laminate these sheet materials to metallic layers by means of conventional adhesives or simple laminating methods.

It is therefore an object of this invention to provide a heat resistant laminated structure comprising a polytetrafluoroethylene sheet material and a metallic layer.

It is also an object to provide a simple, inexpensive method of adhering metallic layers, such as foils or plates, to polytetrafluoroethylene sheet materials, such as, e.g., films, coated fabrics, and coated fabric laminates..

Other important objects will be apparent from the following description of the invention.

I have discovered that, by using an intermediate layer of a copolymer of tetrafluoroethylene and hexafluoropropene, metallic layers may be securely adhered to polytetrafluoroethylene sheet materials in a simple hot-pressing operation.

It is entirely unexpected that the copolymer interlayer should serve to bond the unctuous sheet materials to metal. Moreover, it is surprising that the copolymer can be adhered to metal by simply hot-pressing, since fluorinated polymers in general have been regarded as anti-sticking materials under these conditions.

The copolymers useful in the interlayer of this invention are made from a monomer mixture comprising at least 50% of tetrafluoroethylene, the balance being hexafluoropropene. The adhesive interlayer is preferably a glass fabric coated on both sides with the copolymer.

This invention provides a method of making laminated structures which are particularly useful as high temperature printed circuit materials. It also provides a method of making durable, rigid anti-sticking platens for laminating and molding presses.

The following examples, wherein parts and percents are expressed on a weight basis unless otherwise specified, are given for the purpose of illustrating preferred embodiments of this invention.

EXAMPLE I

A. Preparation of polytetrafluoroethylene sheet material

A woven glass fabric known as Owens-Corning "Fiberglas" ECC-128, having the following specifications:

| | |
|---|---|
| Thickness, mils | 7 |
| Yarn size | 225⅓ |
| Thread count | 42 x 32 |
| Ounces per sq. yd. | 6.00 | was given eight dip coats of an aqueous suspensoid having a formula as follows:

| | Parts |
|---|---|
| Polytetrafluoroethylene | 46.0 |
| "Triton" X-100 [1] | 2.8 |
| Water | 51.2 |
| | 100.0 |

[1] Octyl phenyl polyglycol ether, a dispersing agent added to prevent coagulation and settling.

After each successive dip, the coated fabric was dried by heating gradually to 550° F. With the dipcoating and drying operation completed, the coated surface had numerous tiny voids known as "mud cracks." These were sealed by passing the coated fabric four times between a steel pressure roll heated to 250° F. and a paper-covered counter roll, under a pressure of 40 tons in accordance with the teaching set forth in U.S. Patent 2,539,329. Each side of the coated fabric received two passes in contact with the heated steel roll.

The calendered coating, with "mud cracks" closed, was fused by subjecting it to an air temperature of about 760° F. for about one minute. After cooling, the polytetrafluoroethylene coated fabric had a thickness of 10 mils. It was cut into pieces measuring about 14 by 18 inches.

An 8-ply laminated sheet was made by laying eight of these pieces in superposed relation in a press and joining them into a unitary structure under a pressure of 1500 p.s.i. for 5 minutes at a temperature of 760° F. The hot laminate was then cooled by transferring it to a water cooled press and subjecting it to 1500 p.s.i. pressure for a period of 3 minutes. The resulting semi-rigid laminate of polytetrafluoroethylene coated glass fabric was 65 mils thick.

B. Preparation of adhesive interlayer

A woven glass fabric known as Owens-Corning "Fiberglas" ECC-108, having the following specifications:

| | |
|---|---|
| Thickness, mils | 2 |
| Yarn size | 900½ |
| Thread count | 60 x 47 |
| Ounces per sq. yd. | 1.43 | was given 4 dip coats of an aqueous suspensoid having the following composition:

| | Parts |
|---|---|
| Copolymer derived from a mixture of 85% tetrafluoroethylene and 15% hexafluoroproprene | 40.0 |
| "Triton" X-100 (same as above) | 9.6 |
| Ammonium perfluorocaprylate | 0.4 |
| Water | 50.0 |

The above specified coating composition was prepared in accordance with the teaching set forth in my copending U.S. application, Serial No. 637,633 filed February 1, 1957. The copolymer was prepared in accordance with the teaching of U.S. Patent 2,549,935.

Each successive coat was first dried and then fused by heating gradually to 570° F. The copolymer coated glass fabric had a thickness of 3 mils. A piece measuring 14 by 18 inches was set aside for use as the adhesive interlayer in the subsequent bonding of the previously described laminated sheet to a metallic layer.

C. *Preparation of metallic foil*

A piece of 1 mil copper foil measuring 14 by 18 inches was given a dull finish on one side by means of a mild sandblasting operation.

The three components produced in accordance with sections A, B and C of this example were placed in a laminating press in superposed relation in such a manner that the copolymer coated glass fabric was between the dull side of the metal foil and the polytetrafluoroethylene material.

The assembly was bonded or laminated at a pressure of 1500 p.s.i., a temperature of 700° F., and a dwell time of 3 minutes. Cooling of the laminated structure was performed in a water-cooled press by holding it for 3 minutes under a pressure of 1500 p.s.i.

Several 1 inch wide strips were cut from the bonded structure and tested for strength of adhesion in accordance with Method 5950 of Fed. Spec. CCC–T–191b dated May 15, 1951. A pull of at least 10 pounds per inch was required to separate the metal foil from the laminate. There was no separation of the copolymer interlayer from the polytetrafluoroethylene sheet.

By means of a well known selective etching technique, a portion of the bonded product of this example was converted into a printed electrical circuit; i.e., a circuit configuration was produced by etching away portions of the metal foil. This completed printed electrical circuit had excellent operating qualities and remained undamaged after exposure to temperatures as high as 250° C.

Example I was repeated, using the same methods and materials, except that the copolymer-coated interlayer was omitted. After the final pressing cycle the metal foil could be removed easily from the assembly; i.e., the adhesion was virtually zero.

EXAMPLE II

In this example a single ply of the polytetrafluoroethylene coated fabric of Example I was used as the polytetrafluoroethylene sheet material to which the metallic layer was bonded. All other methods and materials were identical to those of Example I.

The laminated structure of this example was much thinner than the structure of Example I; it was therefore flexible instead of semi-rigid. Adhesive strength between the layers was substantially the same as in Example I. The product was useful as a flexible high temperature printed electrical circuit material.

EXAMPLE III

In this example, the polytetrafluoroethylene sheet material to which the metallic layer was bonded was a 2-ply laminate made from the unfused but calendered polytetrafluoroethylene coated fabric of Example I. Lamination of the two plies was carried out in accordance with the continuous process set forth in U.S. Patent 2,731,068, issued January 17, 1956, to K. F. Richards.

While in superposed relation, two continuous lengths of the unfused coated fabric were passed between four sets of pressure rolls. Each set of pressure rolls consisted of a smooth steel roll heated to 325° F. and a paper-covered roll of the type commonly used in calendering of coated fabrics. The rolls were alternately arranged so that each side of the laminate contacted a heated steel roll twice.

As the roller joined assembly emerged from the pressure rolls it was passed through a heat zone where it was subjected to an ambient temperature of 750° F. for 3 minutes, thus fusing and welding the layers into a unitary structure. After cooling, the continuous 2-ply sheet material was cut into 14 x 18 inch pieces and bonded to copper foil in accordance with the bonding method described in Example I.

Excepting for a slight increase in thickness and stiffness, the properties and usefulness of the product of this example were substantially the same as those of Example II.

EXAMPLE IV

Example I was repeated, except that in place of the metallic foil, a copper-plated steel sheet 200 mils in thickness was used as the metallic layer. The steel sheet had a 1 mil coating of copper, deposited from a cyanide plating bath. An improved bonding surface was produced by mildly sandblasting one side of the plated sheet.

The laminated product, which had a bond strength between the polytetrafluoroethylene sheet and the steel plate of about 10 lbs. per inch, was useful as an anti-sticking platen for laminating presses.

EXAMPLE V

Example I was repeated, except in place of the metallic foil an electrical circuit having a predetermined configuration was bonded to the polytetrafluoroethylene sheet. The electric circuit was a conductive pattern die-punched out of 1 mil copper foil. The bonded product was a high quality heat resistant printed circuit material.

EXAMPLE VI

A woven glass fabric known as Owens-Corning "Fiberglas" ECC–108, having the specifications listed hereinbefore (section B of Example I), was given two dip coats of the polytetrafluoroethylene aqueous suspensoid of Example I. After each successive dip, the coating was dried and then fused by gradually heating to 750° F. A coated fabric having a total thickness of 3 mils was thus produced. When cool, the coated fabric was cut into 14 x 18 inch pieces. A 25-ply laminated sheet was made by laying the pieces in superposed relation in a press, where they were laminated and cooled according to the procedure described in section A of Example I. The resulting unitary rigid sheet material had a thickness of 65 mils.

Example I was then repeated, substituting the above produced polytetrafluoroethylene sheet material for the one used in Example I. The product of this example had properties similar to that of Example I.

It will be understood that the above examples are merely illustrative, and that the present invention resides primarily in the discovery that copolymers of tetrafluoroethylene and hexafluoropropene act as surprisingly effective adhesive interlayers for bonding metallic layers to polytetrafluoroethylene surfaces or sheet materials.

Copolymers made from about 50 to 95% tetrafluoroethylene and about 50 to 5% of hexafluoropropene can be used in the adhesive interlayer of this invention. It is preferred to use a copolymer of about 80 to 90% tetrafluoroethylene and about 20 to 10% hexafluoropropene. Unsupported films of the copolymers can be used. It is preferable in most cases to employ an interlayer consisting of a heat resistant fabric, such as glass fabric, coated on both sides with the copolymer to maintain dimensional stability.

The copolymers, and films made therefrom, may be prepared according to the teachings of U.S. Patent 2,549,935, issued April 24, 1951, to J. C. Sauer. A detailed description of the preferred copolymer compositions for coating the glass fabric, with methods of preparing and using the same, is given in my copending application Serial No. 637,633, filed February 1, 1957.

A single thin layer of the copolymer film or coated fabric will ordinarily give satisfactory adhesion, and the use of thick or multiple layers beyond those of the examples would only add unnecessarily to the cost of the product. By hot pressing the copolymer coated fabric alone into adhesive contact with a metallic layer, a laminate is produced which is useful in printed circuits and other applications where a polytetrafluoroethylene is not necessary; e.g., when somewhat lower heat resistance is permissible.

The polytetrafluoroethylene layer to which the metallic layer is to be bonded may be a polytetrafluoroethylene film, sheet, coated fabric, or a structure having only a polytetrafluoroethylene surface. Although the thickness of the polytetrafluoroethylene layer is not critical, it is most practical and economical to keep the layer reasonably thin. Heat transfer problems are likely to be encountered in the bonding process when thicknesses of more than about 500 mils are used.

In products requiring maximum toughness, abrasion resistance, or cut-through resistance in the polytetrafluoroethylene component, a coated fabric sheet of one or more plies is preferred. An electrical grade of glass fabric is, of course, recommended for printed circuit and other electrical applications. Otherwise, the woven glass fabric of the examples may be replaced with any fabric resistant to the fusing and bonding conditions, e.g., non-woven glass fabrics, woven and non-woven asbestos fabrics, and woven metal wire fabrics.

The polytetrafluoroethylene coating compositions and coating methods illustrated in the specific examples may be replaced by any composition and method capable of producing a fused layer of polytetrafluoroethylene on a substrate. Dip coating with aqueous suspensoids is believed to be the most practical method currently known for preparing the polytetrafluoroethylene sheets useful in this invention. Typical aqueous polytetrafluoroethylene coating compositions and methods are disclosed and claimed in U.S. Patent 2,559,752, issued July 10, 1951, to K. L. Berry, and in U.S. application Serial No. 411,021, filed February 17, 1954, in the name of R. E. Fay.

Copper foil is used in the specific examples because copper is the most widely used metallic layer in printed circuit materials. However, the bonding method and structures of this invention are in no way intended to be limited to any particular kind of metallic layer. The metallic layer may be of any kind of metal, of any thickness, such as, e.g., steel, aluminum, brass, iron, etc., and the surface to be bonded may be smooth or rough. The metallic layer may also contain two or more different kinds of metal. The metallic layer may be applied to the copolymer interlayer before spray metallizing, vacuum metallizing, or electro-deposition.

It is preferred, for best adhesion, to have the bonding surface of the metallic layer slightly roughened, as is customary in most methods of adhesive bonding to metals. The bonding surface should, of course, also be clean and free of contaminants, such as oils and loose residues. Surface dulling or roughening is accomplished in any convenient manner, such as sanding, grit blasting, or etching.

Bonding of the metallic layer to the polytetrafluoroethylene layer according to this invention is preferably carried out under the following range of conditions: a temperature of about 600 to 740° F., a pressure of about 200 to 3000 p.s.i., and a pressing time of about 1 to 10 minutes. Although some adhesion can be achieved with conditions slightly outside of these conditions, the result will be an objectionable sacrifice in product adhesion and other qualities. The most generally preferred bonding conditions are illustrated in the specific examples, viz., about 1500 p.s.i. pressure, about 700° F. heat, and about 3 minutes time, followed by cooling under a like pressure and time.

The bonding method of the present invention has the obvious advantage of eliminating the costly and time consuming step of applying a primer coat to the metal. It has the further advantage over the prior art method of introducing no acids or other ingredients into the bonding layer which will deteriorate the product's electrical properties and high temperature adhesive strength. The adhesive interlayer of this invention is, of itself, an excellent high temperature insulation material.

When compared with conventional printed circuit materials, such as phenol-aldehyde laminates bonded to metallic layers, the product of this invention is again superior to the prior art, particularly for use at temperatures of about 200 to 250° C., at which conventional materials will decompose and become useless. Other advantages are the chemical inertness and the extremely low moisture absorption properties of the polytetrafluoroethylene layer.

Materials and articles which cannot be adhered directly to the unctuous surface of polytetrafluoroethylene can be fastened to the metallic layer by conventional methods, such as soldering, riveting, and adhesive bonding, either before or after the bonding process of this invention.

In addition to the usefulness of the process of this invention for making printed circuit materials and anti-sticking platens, many other uses will become apparent in view of the detailed description of the invention given herein. Uses may be found wherever it is desired to combine the properties of polytetrafluoroethylene layers with the properties of metallic layers in a single integrated structure.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

The embodiments of the invention in which an exclusive property or privilege is claimed are defined as follows:

1. In the process of preparing a laminated structure comprising heating and pressing an assembly of one outer layer comprising polytetrafluoroethylene, the other outer layer being a metal and an intermediate bonding layer comprising a copolymer of 50–95% tetrafluoroethylene and 50–5% hexafluoropropene, the improvement which comprises forming said intermediate layer by coating both sides of a glass fabric with said copolymer and incorporating said interlayer in said assembly prior to said heating and pressing step, whereby said copolymer is prevented from spewing at the edges of said assembly during said heating and pressing step.

2. The process of claim 1 in which said metal outer layer of copper.

3. The process of claim 1 in which said outer layer comprising polytetrafluoroethylene is a plurality of plies of glass fabric coated on each side with polytetrafluoroethylene and laminated into a unitary structure.

References Cited in the file of this patent

UNITED STATES PATENTS

| | | |
|---|---|---|
| 2,539,329 | Sanders | Jan. 23, 1951 |
| 2,549,935 | Sauer | Apr. 24, 1951 |
| 2,731,068 | Richards | Jan. 17, 1956 |
| 2,774,702 | Smith | Dec. 18, 1956 |
| 2,774,705 | Smith | Dec. 18, 1956 |
| 2,833,686 | Sandt | May 6, 1958 |

FOREIGN PATENTS

| | | |
|---|---|---|
| 660,398 | Great Britain | Nov. 7, 1951 |

UNITED STATES PATENT OFFICE
CERTIFICATE OF CORRECTION

Patent No. 2,989,433　　　　　　　　　　　　　June 20, 1961

Edward Lung Yuan

It is hereby certified that error appears in the above numbered patent requiring correction and that the said Letters Patent should read as corrected below.

Column 6, line 58, for "of" read -- is --.

Signed and sealed this 14th day of November 1961.

(SEAL)
Attest:

ERNEST W. SWIDER　　　　　　　　　　　　　DAVID L. LADD
Attesting Officer　　　　　　　　　　　　　Commissioner of Patents

USCOMM-DC